United States Patent [19]

Hellman

[11] 4,290,208

[45] Sep. 22, 1981

[54] PROCESS FOR THE DEHUMIDIFICATION OF MOIST AIR OR SATURATED WATER VAPOR

[76] Inventor: Lars G. Hellman, Norrtullsgatan 10, 113 27 Stockholm, Sweden

[21] Appl. No.: 133,877

[22] Filed: Mar. 25, 1980

[30] Foreign Application Priority Data

Apr. 4, 1979 [SE] Sweden ................................. 7902979

[51] Int. Cl.$^3$ ............................................... F27D 3/00
[52] U.S. Cl. ............................................. 34/9; 34/27
[58] Field of Search ....................... 34/26, 27, 32, 74, 9

[56] References Cited

U.S. PATENT DOCUMENTS 2,249,624  7/1941  Bichowsky .............................. 34/27

Primary Examiner—John J. Camby

Attorney, Agent, or Firm—Wigman & Cohen

[57] ABSTRACT

A counter-current absorption process for the dehumidification of moist air or saturated water vapor is described. The absorption liquid used in said process consists of an aqueous solution of one or more non-volatile components. The absorption is carried out adiabatically, that is without substantial heat exchange with the surroundings, and with weight proportions between the absorption liquid and the gas or vapor such that most of the condensation heat of the water vapor condensed during the absorption is transferred to the gas or vapor becoming progressively drier, to thereby raise the temperature thereof. The diluted absorption liquid is concentrated by evaporation and is then recycled for reuse. The demoisturized and heated air or vapor is used e.g. in a drying process and is then recycled to the absorption device.

4 Claims, No Drawings

PROCESS FOR THE DEHUMIDIFICATION OF MOIST AIR OR SATURATED WATER VAPOR

BACKGROUND OF THE INVENTION

The present invention relates to a process for the dehumidification of moist air or saturated water vapour by an adiabatic absorption by means of a suitable absorption liquid above which the water vapour pressure is low.

The invention is especially useful in the drying of various materials, such as wood, cellulose, paper, peat, etc., but it may also be used e.g. in the dehumidification of air in public baths or municipal wastewater treatment plants. The following description will mainly relate to the use of the novel dehumidification process in connection with drying but the invention is not limited thereto.

The drying process is the most energy consuming of all the industrial processes comprising the separation or removal of a liquid from a solid substance. Mechanical separation methods, such as filtration, pressing, etc., are the least energy consuming methods, but also evaporation performed as multiple or flash evaporation requires much less energy than a drying process. The amount of energy consumed by multiple evaporation—expressed as the amount of steam consumed for the heating—is 0.2–0.5 tons of heating steam per ton of evaporated water; while a drying process will consume 1.2–2.2 tons of heating steam per ton of water removed.

OBJECT AND SUMMARY OF THE INVENTION

The object of the invention is to provide a means for avoiding the great energy consumption in the drying process. According to the system currently used a quantity of fresh air is preheated and brought into contact with the material to be dried in the drying device, wherein the air takes up moisture from said material. The air is then reheated, takes up additional moisture from the material to be dried, is reheated again, etc., etc. After having reached a sufficiently high absolute humidity the air is removed from the system in the form of so called moist air having a relative humidity of 90–100%. The possibilities of heat recovery at a reasonably high exergetic level are limited. It is true that it is possible to preheat the fresh air fed into the system but the temperature attained is rather low. The energy consumption for such a system may be considered as composed of (I) the heat of vaporization of the water removed and (II) the quantity of heat required to heat the fresh air from the inlet temperature to the outlet temperature. To that must of course be added the need for heating the material to be dried, heat losses, etc.

The successively repeated heating of the air in order to reduce the relative humidity each time may according to the invention be replaced by an adiabatic dehumidification of the air. Such an adiabatic dehumidification is carried out counter-currently in a column, a scrubber or the like by means of a suitable moisture-absorbing liquid. In the adiabatic dehumidification process the water vapour content of the air will condense in the liquid. By means of a suitable absorption liquid and above all by means of a suitable weight ratio air/liquid almost all the condensation heat of the condensed water vapour can be transferred to the demoisturized air whereby the temperature thereof will be raised considerably. After the dehumidification the air may be recycled to the drying device for reuse. By those means the drying process itself may be said to have been performed without any substantial energy consumption. However, this effect has been obtained by a dilution of the absorption liquid; but said liquid can be evaporated. By using multiple evaporation or flash evaporation the specific energy consumption of drying processes may in this way, by means of the invention, be reduced to the same level as that of evaporation processes.

Thus, the invention relates to a counter-current absorption process for the dehumidification of moist air or saturated water vapour, e.g. obtained in the drying of solid material; wherein a concentrated absorption liquid is fed to an absorption device at a temperature at least equal to the temperature which at atmospheric pressure corresponds to the boiling point of the absorption liquid at the concentration corresponding to the water vapour pressure reduction required in order to attain the desired low relative humidity of the exit gas or the desired degree of superheating of the exit water vapour, respectively. Said process is characterized in that the only component of the absorption liquid having a substantial vapour pressure is water; that the absorption is carried out adiabatically, that is without substantial heat exchange with the surroundings, and with weight proportions between the absorption liquid and the gas or vapour such that most of the condensation heat of the water vapour condensed during the absorption is transferred to the gas or vapour becoming progressively drier, to thereby raise the temperature thereof; and that the diluted absorption liquid obtained after the absorption is concentrated and recycled for reuse while the demoisturized and heated gas or vapour is recycled for again taking up moisture or for being again converted to saturated water vapour.

DESCRIPTION OF A PREFERRED EMBODIMENT

When the process according to the invention is applied to a drying operation the inherent energy (the energy content) of the water vapour obtained on said concentrating of the absorption liquid should be controlled by accordingly selecting an evaporation method for this purpose (multiple evaporation, compression evaporation, etc.) such as to prevent said inherent energy from exceeding the energy amount required for preheating the material to be dried, inclusive of the water content therein, from the ambient temperature to the drying temperature.

The amount of the absorption liquid should be adapted to the water amount absorbed. Since the absorption liquid does not contain any volatile component other than water it is possible to attain the conditions stated above by means of an adiabatic process.

The absorption liquid may consist of one or more non-volatile components dissolved in water. The solubility of the non-volatile components must be considerable in order to bring about a substantial reduction of the water vapour pressure above the solution. Useful non-volatile components are e.g. potassium acetate, sodium acetate, potassium carbonate, calcium chloride, lithium chloride and lithium bromide. Particularly good results are obtained with a mixture of about 30% by weight of sodium acetate and about 70% by weight of potassium acetate.

The absorption liquid when introduced into the process may have such temperature and concentration that it consists of a melt of the non-volatile component(s), completely free from water or with only a small water content.

The temperature increase of the gas in the absorption process depends entirely upon the amount, concentration, etc., of the salt solution added. A moist air having a temperature of 50° C. and a relative humidity of 100% ($\phi=1.0$) contains 0.08 kg $H_2O$/kg dry air. If said air is to be dehumidified to $\phi=0.1$ containing 0.066 kg $H_2O$/kg dry air a salt solution having an input concentration (entrance concentration) with equilibrium data better than $\phi=0.1$ must be used in such an amount that the water vapour amount absorbed does not cause too great a dilution of the solution; so that the water vapour pressure above the solution leaving the absorption device is still lower than that corresponding to $\phi=1.0$.

An adiabatic absorption process according to the invention is exemplified as follows. An amount of air is assumed to contain 7500 kg of water and to have a temperature of 60° C. and a relative humidity of 90%. If said air is made to flow in counter-current contact with a liquid above which the water vapour pressure is only 15% of the vapour pressure above pure water at the corresponding temperature the water content of the air can thereby be reduced to e.g. 6500 kg. At the same time the absorption liquid has absorbed 1000 kg of water from the air and thus has been diluted. On the other hand the air has been supplied with an energy amount corresponding to the condensation heat of 1000 kg of water vapour; this energy amount will raise the temperature of the air from 60° C. to about 106° C. At the same time the relative humidity has dropped to about 15% so that the air can be reused, e.g. as drying air.

The invention is not limited to cases where the air has an energy carrier function in a drying process; on the contrary, the invention is applicable also to e.g. cases where the heat transfer to the material to be dried takes place wholly or partly by convection, for instance as in the cases where roller driers of various types are employed, although heat savings here will not at all be of the same order of magnitude as in the example described above.

A method commonly employed for drying cellulose or paper comprises both convective and airborne energy transfer to the material that is to be dried. The convective transfer is accomplished by means of passing the material to be dried over steam-heated rollers. The rollers in addition to their mechanical function of causing the material to advance have the additional function of shortening the time required for the drying, due to an increased evaporation of water. Adiabatic dehumidification of the moist air provides also in this case a possibility of recycling dehumidified or demoisturized air in a more or less closed circulation system. A certain amount of steam condensation corresponding to the amount evaporated by the indirect heating via the drying rollers may be desirable for economical reasons prior to the adiabatic dehumidification of the moist air, such condensation being effected by cooling of the moist air.

Similarly in the case of a spray drying operation it may be desirable that after adiabatic dehumidification of the moist air a certain amount of heat is supplied indirectly to the drying air prior to the reentry of the drying air to the spray drying device, to thus reduce the necessary residence time of the material in the drying device.

The invention also comprises cases where drying is effected with a heat-carrier gas consisting of superheated steam; during the drying process, this superheated steam becomes more or less saturated; and due to the adiabatic absorption procedure the steam will then again be obtained in a superheated state in which it is reusable for the drying process; the absorption liquid is subjected to a concentrating operation in the manner described above.

I claim:

1. A counter-current absorption process for the dehumidification of moist air or saturated water vapour, e.g. obtained in the drying of solid material comprising the steps of: introducing a concentrated absorption liquid into an absorption device at a temperature at least equal to the temperature which at atmospheric pressure corresponds to the boiling point of the absorption liquid at the concentration corresponding to the water vapour pressure reduction required in order to attain the desired low relative humidity of the exit gas or the desired degree of superheating of the exit water vapour, the only component of the absorption liquid having a substantial vapour pressure is water; introducing moist air or saturated water vapour into said absorption device counter-current to said liquid where the absorption is carried out adiabatically, and with weight proportions between the absorption liquid and the gas or vapour such that most of the condensation heat of the water vapour condensed during the absorption is transferred to the gas or vapour becoming progressively drier, to thereby raise the temperature thereof; regenerating the diluted absorption liquid obtained after the absorption is concentrated and recycling the concentrated liquid for reuse while the demoisturized and heated gas or vapour is recycled for again taking up moisture or for being again converted to saturated water vapour.

2. A process according to claim 1 applied to a drying operation further comprising, utilizing an evaporation method for preventing the inherent energy of the water vapour during regeneration of the liquid from exceeding the energy amount required for preheating the material to be dried, inclusive of the water content therein, from the ambient temperature to the drying temperature.

3. A process according to claim 1 or 2, wherein the absorption liquid is an aqueous solution of one or more salts selected from the group consisting of potassium acetate, sodium acetate, potassium carbonate, calcium chloride, lithium chloride, lithium bromide.

4. A process according to claim 3, wherein the absorption liquid is an aqueous solution of a mixture of about 30% by weight of sodium acetate and about 70% by weight of potassium acetate.

* * * * *